United States Patent [19]
Armstrong et al.

[11] Patent Number: 5,339,352
[45] Date of Patent: Aug. 16, 1994

[54] DIRECTORY ASSISTANCE CALL COMPLETION VIA MOBILE SYSTEMS

[75] Inventors: Michael G. Armstrong, Philadelphia, Pa.; Jennifer L. Glacken, Bel Air, Md.

[73] Assignee: Bell Atlantic Network Services, Inc., Arlington, Va.

[21] Appl. No.: 953,675

[22] Filed: Oct. 1, 1992

[51] Int. Cl.⁵ .................................. H04M 11/00
[52] U.S. Cl. .................................. 379/58; 379/88; 370/60
[58] Field of Search .................. 370/60; 379/52, 56, 379/58, 67, 84, 88, 213, 260

[56] References Cited

U.S. PATENT DOCUMENTS

| | | | |
|---|---|---|---|
| 4,112,257 | 9/1978 | Frost . | |
| 4,608,460 | 8/1986 | Carter et al. . | |
| 4,640,986 | 2/1987 | Yotsutani et al. | 379/60 |
| 4,677,609 | 6/1987 | Piereth et al. | 370/60 |
| 4,777,646 | 10/1988 | Harris | 379/91 |
| 4,958,368 | 9/1990 | Parker | 379/91 |
| 4,959,855 | 9/1990 | Daudelin | 379/213 |
| 4,965,821 | 10/1990 | Bishop et al. | 379/91 |
| 4,979,206 | 12/1990 | Padden et al. | 379/67 |
| 4,979,207 | 12/1990 | Baum et al. | 379/112 |
| 5,063,591 | 11/1991 | Jodoin | 379/115 |
| 5,095,503 | 3/1992 | Kowalski | 379/63 |
| 5,109,401 | 4/1992 | Hattori et al. | 375/58 |
| 5,148,472 | 9/1992 | Freese et al. | 379/59 |
| 5,181,237 | 1/1993 | Dowden et al. | 379/88 |

FOREIGN PATENT DOCUMENTS 0017752  1/1990  Japan ................................. 379/88

OTHER PUBLICATIONS

Guiard, Le Moign, Marchand, "The Electronic Directory Within the Company", Commutation & Transmission #2-1983.
"Directory Assistance System", British Telecommunications Engineering, vol. 5, Jan. 1987.

Primary Examiner—Curtis Kuntz
Assistant Examiner—William Cumming
Attorney, Agent, or Firm—Lowe, Price, LeBlanc & Becker

[57] ABSTRACT

A user of a wireless communication service, e.g. a cellular telephone subscriber, can dial directory assistance; and upon request, the operator service system (OSS) will complete a call connection to a station identified in a retrieved directory listing. The switching office of the wireless communication system will forward data to the operator service system and will provide a connection of the call to the operator service system, both via a dedicated trunk. This trunk utilizes Feature Group D signaling. The OSS identifies the particular carrier providing the wireless communication service based on the identification of the dedicated trunk. The operator service system records the request for call completion, any details of the connection to the identified station necessary for billing and the identity of the requesting terminal. All of this data is forwarded to the identified service operator who in turn adds charges for directory assistance and for the call completion to the user's bill for wireless communication services.

34 Claims, 3 Drawing Sheets

DIRECTORY ASSISTANCE CALL COMPLETION VIA MOBILE SYSTEMS

TECHNICAL FIELD

The present invention relates to methods and systems for completing directory assistance calls from a wireless telephone to a station identified in a directory listing.

BACKGROUND ART

Directory assistance call completion or "DACC" service has been deployed by a number of the local telephone operating companies (TELCO's). The DACC service enables a directory assistance caller to request and obtain automatic completion of a call to the station identified in the requested directory listing, for example by simply pressing "one" on a dual tone multi-frequency telephone, such as a TOUCHTONE telephone. The directory assistance telephone system and the associated telephone network provide a completed voice grade connection between the caller's station and the station identified by the directory listing and record an additional charge, e.g. $.30, for billing on the caller's telephone bill. Set up of the connection to the destination station is faster than for manual dialing. Such automatic call completion also eliminates the need for the caller to memorize or write down the telephone number from the retrieved directory listing.

DACC eligibility screening is performed on every directory assistance call. Calls involving inter-LATA completions as well as calls from selected stations such as hotels, dormitories, etc., typically are screened out and the caller is not offered DACC. In addition, present systems screen out calls from cellular telephone users. Present systems do not offer the DACC service to cellular customers because with current network arrangements it is not possible to bill the individual cellular station subscriber for the DACC related charges, as discussed below.

A mobile telephone switching office or "MTSO" is owned and operated by the cellular carrier. The MTSO provides a switched connection point between the network operated by the cellular carrier and the landline telephone network. In existing cellular systems, the Mobile Telephone Switching Office (MTSO) receives dialing information from the mobile telephone and establishes a trunk connection to a local switching office of the landline telephone network. The MTSO forwards pertinent data to the local office, including the destination telephone number, and the local office uses that information to complete the landline portion of the call through the telephone network to the destination station.

The cellular system treats directory assistance calls in a similar manner. The cellular telephone user dials 411, 555-1212, or area code plus 555-1212, and the MTSO establishes a trunk connection to the local switching office. The MTSO forwards the pertinent data to the local office, including the information service number, e.g., 555-1212. The call is routed through the landline telephone network to an Operator Service System (OSS) and connected to an available operator position terminal.

The cellular carrier, through programming in the MTSO, knows that the cellular subscriber has made a directory assistance call and the air time for each such call; and the cellular carrier can bill accordingly. Once the call reaches the OSS, however, the MTSO is no longer expecting any dialed digit data from the cellular telephone. Thus the MTSO does not have a DTMF receptor monitoring the call and will not recognize the dialing of a "1" or the like to request call completion via a DACC service. The cellular carrier therefore would not know that the subscriber requested call completion and could not bill for servicing the request.

Under present procedures, the telephone network also can not identify the particular cellular subscriber who might initiate a directory assistance call completion request. In many systems presently in use, the data forwarded from the MTSO to the OSS for a call from a cellular telephone does not include any form of automatic number identification data (ANI) corresponding to the actual cellular station which initiated the call. Instead, MTSO's in such systems forward no ANI at all or forward only a number corresponding to the MTSO for all directory assistance calls. The TELCO bills the cellular carrier for directory assistance calls on a per call basis, and the cellular carrier passes the charges on to individual subscribers who made directory assistance calls during a given billing period, but there is no effective way to bill for call completion services if provided to a cellular customer.

It would be possible to bill directory assistance call completion charges to the cellular carrier, but because there is no data stored by either the cellular carrier or the TELCO, there is no way to bill the charges to each cellular caller who actually requested such call completion. The cellular carrier would have to average any additional charges incurred as a result of the call completion into cellular system charges for directory assistance calls or into the charges for all cellular calls. Cellular carriers have been unwilling to bill call completion on such an average basis, and consequently call completion has not been offered to cellular telephone service subscribers.

It can be seen from the above analysis that directory assistance call completion is a desirable service which existing call processing procedures and existing communications systems can not offer to cellular telephone subscribers.

DISCLOSURE OF THE INVENTION

1. Objectives

One objective of the present invention is to provide directory assistance call completion to all subscribers, including roaming users initiating intra-LATA directory assistance calls from a mobile wireless communication terminal, such as a cellular telephone.

Another objective of the present invention is to provide a communications system and call processing procedures which facilitate billing all charges incurred by directory assistance call completion services provided to a mobile wireless communication terminal, such as a cellular telephone, to the subscriber who actually requests the call completion service.

A further objective is to provide directory assistance call completion service to customers of wireless communication carriers and non-BELL exchange carriers and to supply such carriers with detailed report data regarding completed calls, to facilitate billing for the service to the individual customers.

To provide a viable product acceptable to wireless communication carriers, e.g. the existing cellular carriers, and other non-BELL exchange carriers it is necessary to capture billing details in the OSS including the ANI of the actual calling station, the DACC surcharge and any charges applicable to the subsequent landline connection. All this information must be associated with the specific carrier for which a TELCO provides the call completion service. Each billing record generated by the directory assistance service system must in some way identify the carrier for downstream billing processes. Conceptually, this will enable the TELCO to bill the carrier for actual services rendered, and the necessary billing detail will be provided to the carrier to allow billing to specific calling subscribers.

2. Summary

To achieve the stated objectives and produce a viable service for offering to wireless carriers and subscribers, the present invention provides method and apparatus for identifying the calling wireless communication terminal to the operator service system (OSS). Typically, the directory assistance calls from the carrier will be routed to the operator service system via a dedicated trunk group between the mobile switching system and the operator service system. The particular trunk group on which the operator service system receives a given directory assistance call therefore serves as a means to identify the carrier. The data identifying the terminal, typically the 10-digit ANI of the terminal, identifies a particular subscriber who should be billed for all relevant charges, including a call completion charge and any additional charges incurred during the subsequent landline connection to the destination station.

Thus in a first aspect, the present invention is a system for providing a directory assistance call completion service to a subscriber to a wireless communication service offered via a base station and a mobile communications controller. Typically this system would be operated by a landline telephone company such as a local TELCO or an interexchange carrier (IXC). The system includes an operator service system (OSS) which has at least one operator position terminal with access to a data base of directory listings as well as announcement devices which provide the requested directory listing to the calling subscriber. A dedicated trunk connects the mobile telephone switching office (MTSO) to the OSS. The dedicated trunk carries data identifying a wireless communication terminal, which has requested directory assistance. The dedicated trunk also carries information signals between the MTSO and the OSS. The MTSO, the trunk and the OSS provide two way communications between the wireless communication terminal and the operator position terminal. The OSS responds to the data forwarded via the dedicated trunk and to a request for call completion from the wireless communication terminal by establishing an appropriate landline communication link between the MTSO and a station identified in a requested directory listing. This link permits two-way communications between the wireless communication terminal and the identified station.

In another aspect, the invention provides both method and apparatus for offering a directory assistance call completion service to a wireless telephone service subscriber. The system receives a request for directory assistance from the terminal at a mobile communications switching office. This office forwards data identifying the wireless communication terminal to an operator service system (OSS). The MTSO also sets up a landline communication link to the OSS. This landline link allows two way communications between the wireless communication terminal and the OSS. The subscriber then provides information identifying a particular listing from a directory of listings, for example by conversing with an operator at a terminal of the operator service system. This information is used to retrieve a destination number corresponding to the identified listing from the directory of listings. For example, the destination number is retrieved from a telephone directory data base, and the operator transfers the call to an announcement which provides the number and offers DACC service to the calling subscriber on eligible calls. If the subscriber enters a request for call completion, a landline communication link is established. This link provides a complete communication connection between the wireless communication terminal and the identified station. The operator service system records the data identifying the wireless communication terminal.

In a different aspect, the invention provides directory assistance call completion service using a dedicated trunk providing Feature Group D type signalling between a communications switching system, such as the mobile telephone switching office (MTSO) of a cellular network, and a directory assistance service system. In response to dialing of a directory assistance number on a terminal, the MTSO provides data identifying the terminal to the OSS system via a dedicated trunk using FG-D signaling. The communications switching system also provides a communication link between the terminal and the OSS via the dedicated trunk. The OSS includes means to establish an appropriate communication link to the identified station, to permit two-way communication. The OSS also records the identity of the terminal which originated the directory assistance call and the request for call completion.

In a further aspect, a system in accord with the present invention provides a directory assistance call completion service to a wireless communication terminal. In this aspect the system includes a wireless communications system selectively providing communication services to the wireless communication terminal. An OSS provides access to a data base of directory listings. A dedicated trunk connects a landline interface of the wireless communications system to the operator system OSS. In response to dialing of a directory assistance number on the wireless communication terminal, the wireless communications system provides data identifying the wireless communication terminal to the directory assistance service via the dedicated trunk. The wireless communications system also provides a communication link between the wireless communication terminal and the OSS via the dedicated trunk. The OSS establishes a completed landline communication link to the identified station and records the identity of the wireless communication terminal which received the call completion service.

In the preferred embodiments of the invention, the terminal is a cellular telephone station. The destination station identified by the number in the retrieved directory listing is typically a telephone station connected to the public switched telephone network. The OSS uses the identity of the dedicated trunk to identify the cellular carrier providing services to the calling subscriber. The OSS uses the data identifying the calling terminal to develop detailed billing records, including the surcharge for the call completion request and charges associated with the landline portion of the completed call. The OSS can also screen calls to limit situations in which directory assistance callers are offered the call completion option.

The service provided by the invention will enable the cellular user, including roamer users, to have Directory Assistance calls automatically completed and is a natural extension of existing DACC service offerings. Directory assistance call completion offers special advantages to cellular telephone subscribers, particularly where the cellular telephone is installed in a vehicle. The driver can use the service simply by dialing the directory assistance number, e.g. 411, conversing with the operator to obtain the listing, and then dialing "1" to request actual completion. In fact, the dial "1" step could be eliminated by presubscribing to the completion service. The OSS would recognize that an incoming call was from a completion subscriber and complete the call using the directory listing information if the caller did not hang up within a set time. In either case, the number actually dialed can be quite small, and the caller only needs to remember the directory assistance number. The subscriber does not need to know the entire telephone numbers for large numbers of persons she might choose to call, and there is no need to program a list of telephone numbers into an expensive autodialer associated with the cellular telephone. The DACC service also eliminates the need for the subscriber to memorize or write down and then dial a telephone number received during a directory assistance call, which can be particularly difficult and potentially hazardous while driving.

To provide the service it will be necessary to make software changes in existing OSS's. The new software utilizes the capability of Feature Group D signaling. The new software will allow the OSS to receive a Feature Group D signal from the cellular carrier MTSO which will include the Automatic Number Identification of the cellular station actually placing the call. This is necessary for billing purposes since all AMA recording for these calls is performed at the OSS switch, not at the MTSO. Specifically, the OSS will record the charge for the Directory Assistance call, the DACC surcharge and also the charge for the landline portion of the call. In the present environment, cellular end user billing records for Directory Assistance calls are generated at the MTSO.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
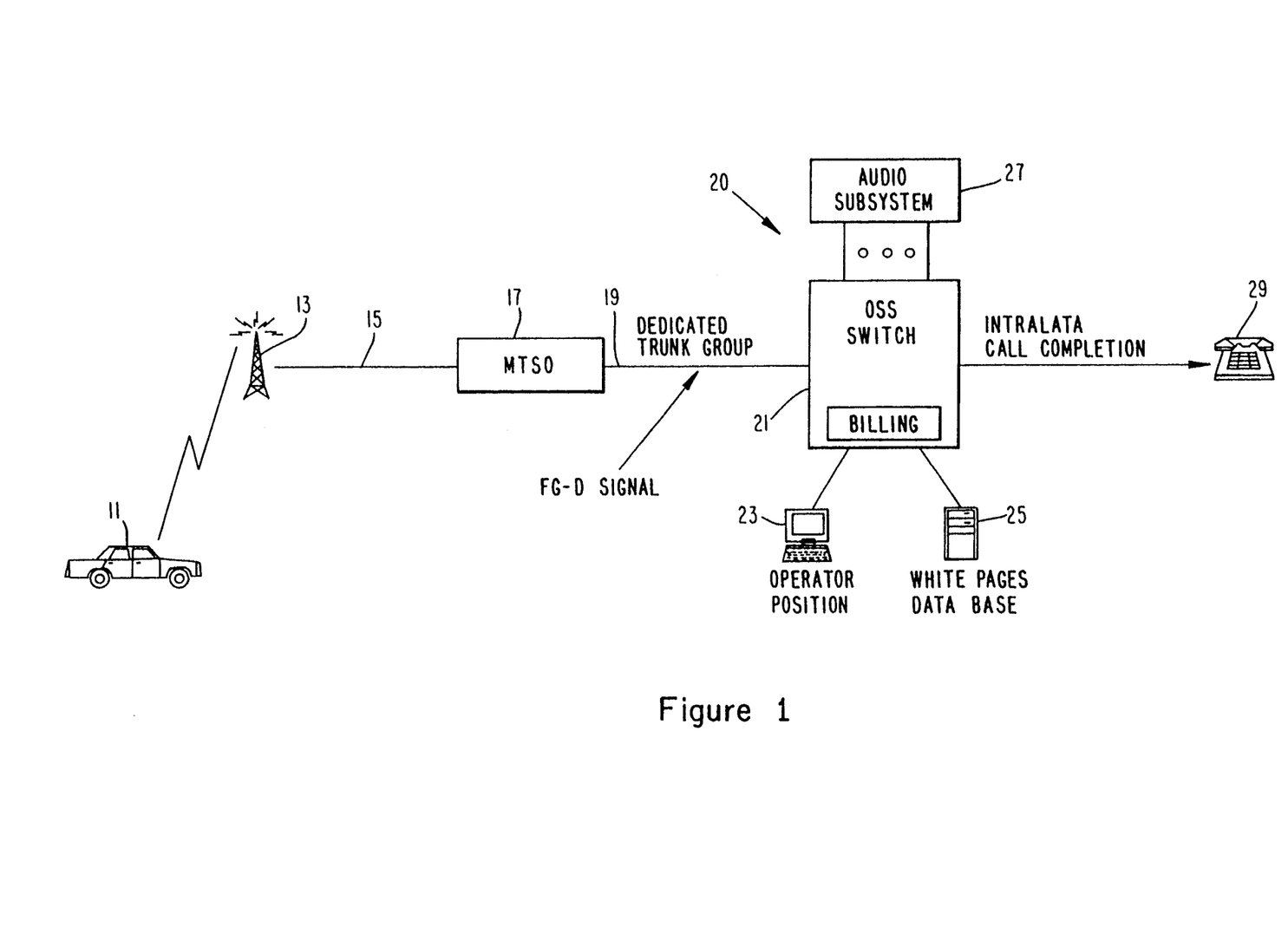
FIG. 1 provides a conceptualized illustration, in general block diagram form, of the communication system for implementing the directory assistance call completion service for cellular subscribers, in accord with the present invention.

FIG. 1 shows the system of the present invention, in simplified block diagram form, including the necessary components for providing the service to cellular subscribers located in a single Local Access and Transport Area (LATA).

By way of a simple example, FIG. 1 shows a single automobile 11, with a cellular telephone station installed therein. The system, however, clearly will service a large number of cellular telephone stations. Two-way wireless communications are conducted between the cellular telephone in automobile 11 and one of the cell cite antennas 13 of a cellular network operating within the LATA. A trunk circuit 15 connects cell cite antenna 13 to a mobile telephone switching office (MTSO) 17. The MTSO 17 typically is a program controlled telephone switch set up for processing cellular telephone calls, for example an AUTOPLEX 1000 switch manufactured by AT&T.

The MTSO 17 provides switched connections between communication circuits on the trunk 15 and the landline telephone network. Typically, the MTSO will connect via trunk circuits to one or more local or tandem offices of the local public switched telephone network (not shown) and may connect to the point of presence of one or more Interexchange Carriers (IXC's). For simplicity, FIG. 1 does not illustrate the connections to local or tandem offices or to the IXC's networks.

For processing directory assistance calls, the MTSO 17 also connects via a dedicated trunk 19 with Feature Group D type signaling to the switch 21 of an operator service system 20 (hereinafter referred to as "OSS"). Although the OSS system 20 is capable of providing other operator services, for purposes of the present invention the system 20 functions as a directory assistance service system. In the simplified illustration of FIG. 1, the OSS 20 includes the OSS switch 21, a number of operator position terminals 23, connections to one or more directory listing data bases 25, and an audio subsystem 27. Although not shown, the OSS switch 21 will also connect to other MTSO's and to switching offices of the public switched telephone network to offer directory assistance and DACC services through other cellular carriers and to subscribers to standard telephone services. The significance of using a dedicated trunk, and of using Feature Group D type signaling, will be discussed in detail below.

The OSS switch 21 also is a programmed control type telephone switch, however, this switch is set up specifically to provide a variety of operator services. The OSS switch provides call distribution to a number of operator position terminals. For simplicity, FIG. 1 illustrates only a single one of the operator position terminals 23 which are designated for directory assistance. Other terminals may be provided for other operator functions, such as "0+" operator assistance call processing (e.g., for collect calls), and the OSS switch 21 will route calls to the appropriate type of terminal. The OSS switch 21 therefore provides switched two-way voice communications between the operator position terminals 23 and voice circuits of the dedicated trunk 19 and any other trunks or lines on which calls are received.

The OSS switch 21 also connects to one or more computerized data bases which store directory listing information. FIG. 1 shows a white pages data base 25. The OSS switch 21 provides two-way data communication between the operator position terminals 23 and the data base 25 to allow operators to input selection data and receive the selected listing data retrieved from the information stored in the data base. The OSS switch may also connect to an audio subsystem 27. The audio subsystem replays standardized prompt messages and digitized speech announcements of retrieved directory listing information for transmission through the switch to callers requesting directory assistance and call completion services.

The OSS switch 21 also provides switched connections of calls received on the incoming directory assistance trunks, such as dedicated trunk 19, to trunks and-/or lines of the public switched telephone network. These outgoing connections allow the switch 21 to provide complete call connections to destination stations identified by retrieved directory listing information, for example to the telephone station 29 shown in FIG. 1. Upon completion of such a call connection through MTSO 17 and OSS switch 21, a subscriber in automobile 11 using her cellular telephone can converse with a person answering the call on his telephone station 29.

Northern Telecom and AT&T market operator service systems including the switch 21, terminals 23, interfaces for data base 25 and audio subsystem 27. The data base itself may be provided by one of these switch vendors or by a separate vendor, such as IBM. In the preferred embodiments, the OSS switch is a DMS-200 Telephone Operator Position Switch (TOPS) manufactured by Northern Telecom or Operator Services Position System (OSPS) switch which is a 5ESS type switch manufactured by AT&T.

The TELCO's have developed four different Switched Access Service arrangements to provide customer access to alternate long distance interexchange carriers (IXC's). Three of these Switched Access Service arrangements are referred to as Feature Groups A, B and C. The preferred embodiment of the present invention uses the fourth Switched Access Service arrangement, Feature Group D. When used for long distance access to an IXC, Feature Group D provides a trunk side, single dial tone, path to a point of presence at which calls enter the IXC's long distance telephone network. A telephone subscriber identifies an IXC over whose network that subscriber's call should travel, and uses a "1+" dialing procedure to access that long distance network. Specifically, the subscriber takes her telephone handset off-hook, hears and dial tone and then dials "1" plus the ten digit destination telephone number. In response to this dialing procedure, the local TELCO network routes that subscriber's call to the identified IXC's point of presence. The calling subscriber hears only the one dial tone and dials only the "1" plus the destination number.

As part of the Feature Group D procedure for routing a "1+" type call to an IXC's point of presence, the local TELCO's switching office(s) forwards first the calling party's telephone number and the called telephone number to the IXC's switching system. The protocols used in Feature Group D signalling therefore require that the originating switching office transmits ANI data including the calling party's 10-digit telephone number and then the called telephone number, and it is this aspect of Feature Group D signalling which the present invention takes advantage of.

The MTSO 17 is programmed to send all directory assistance calls via the dedicated trunk with FG-D signaling 19, therefore processing of all directory assistance calls will include a forwarding of the calling party's 10-digit telephone number and the called telephone number from the MTSO 17 to the OSS switch 21. The OSS switch 21 normally would process calls received via Feature Group D signaling as long distance calls. In the present system, however, the programming in the OSS switch 21 is modified to consider calls received via the dedicated trunk 19 and any similar trunk from other switching offices of participating carriers as local calls, in spite of the fact that such trunks utilize Feature Group D signaling. The OSS switch 21 may also process calls received via additional Feature Group D signaling over trunks which are connected to landline TELCO switching offices (not shown) as Feature Group D type long distance calls, in the normal manner.

By using a dedicated trunk 19 between the cellular carrier's MTSO 17 and the OSS switch 21, the OSS switch can identify individual carriers by identifying which trunk each directory assistance call came in on. The Feature Group D signalling protocol will include true ANI information for the calling party, i.e. the ten digit number assigned to the actual cellular telephone from which each directory assistance call originated. The OSS switch can also record the destination number derived from the directory listing to identify the ultimate destination of the call. In checking eligibility and calculating landline charges for call completion, the program routines in the OSS switch would use the area code and exchange number (NPA-NXX) of the dedicated trunk 19 (and thus those of the MTSO 17) rather than those from the ANI of the calling cellular stations. For example, the switch can accurately determine whether or not the completed call would be an intra-LATA call. Also, the billing subroutines in the OSS switch 21 can accumulate complete and accurate billing data for all directory assistance calls, including data relating to call completion services provided to cellular subscribers.

The TELCO providing the DACC service can bill the cellular carrier and provide detailed call reporting information for each of the carrier's subscribers, and the carrier can in turn provide detailed billing to each of its subscribers for all charges relating to call completion. This billing would include the surcharge for servicing the call completion request and any charges incurred in providing the landline connection to a particular destination station. The detailed reporting data would also allow the cellular carrier to differentiate its air time charges if desired. For example, completed calls to certain areas would incur standard air time charges, but completed calls to other designated areas would incur higher premium air time charges.

Figure 2:
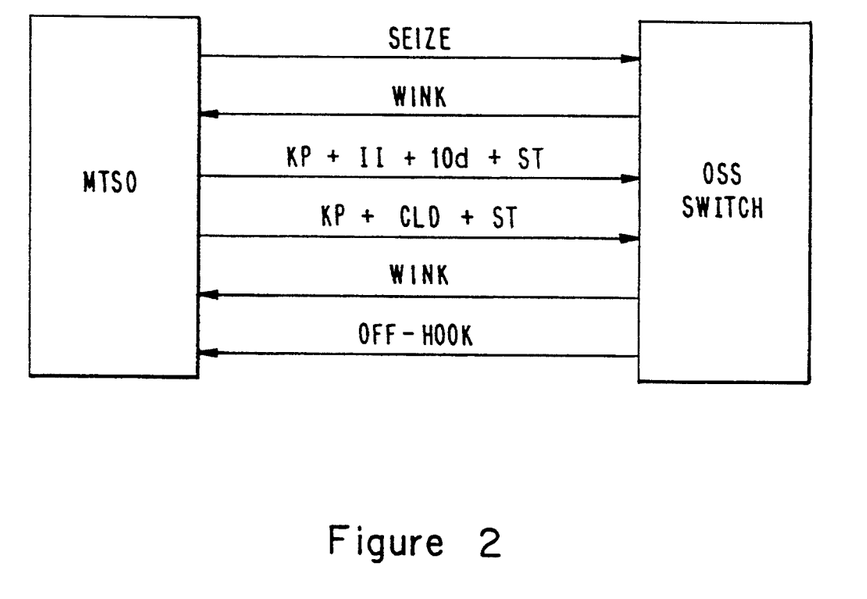
FIG. 2 shows the Feature Group D type signalling between the mobile telephone switching office and the telephone operator position switch.

FIG. 2 illustrates the Feature Group D signaling between the MTSO and the OSS switch. As discussed above, the MTSO 17 routes the directory assistance call via the dedicated trunk 19 using FG-D signaling. In so doing, the MTSO 17 initially transmits a line Seize signal to the OSS switch 21 via the trunk 19 requesting access. The OSS switch acknowledges this request by transmitting a "wink" signal back over the trunk. A wink signal is a temporary reversal of polarity of the "Tip" and "Ring" pair of lines of the trunk circuit simulating a brief on-hook/off-hook transition.

The first wink signal effectively instructs the MTSO 17 to outpulse digits via the trunk to the OSS switch 21. In response, the MTSO sends a first string of characters via the trunk 19. This first string begins with a key pulse signal KP followed by an identifier code II. The II identifier is followed by the ten digit number (10d) of the calling station. An ST code indicates the end of this first character string.

Next, the MTSO 17 sends a second string of characters via the trunk 19. This second string begins with another key pulse signal KP followed by the destination number dialed by the caller (CLD). An ST code indicates the end of this second character string. The OSS switch 21 then sends a second "wink" signal back to the MTSO via the trunk indicating that digit transmission is complete and establishes an offhook condition on the Tip and Ring pair of the trunk circuit 19.

A customer would obtain the DACC service by dialing the directory assistance service system 20 using the code for accessing Directory Assistance (e.g., 411 or 555-1212). Directory assistance Operators working at terminals 23 will process incoming calls in the normal manner. However, when the calls are sent to the audio subsystem 27, eligible callers will be offered the opportunity for their calls to be completed automatically by following the instructions given by the audio subsystem. Information associated with the calling line and requested number is used in the eligibility check. There is no change in the handling of the call if it is determined to be ineligible, i.e. the call is given the standard audio response.

The mechanized announcement for callers eligible for call completion will inform the customer of the availability of the completion service, disclose the appropriate surcharges, provide the requested telephone number, and prompt the caller to depress specific digits from a dial tone multifrequency (DTMF) capable telephone should completion be desired.

Before offering the call completion option to any caller, the operator service system 20 performs a check to determine if the current caller is eligible for that service. The completion service may be offered only to directory assistance customers whose originating and called line numbers are within the same LATA. The operator service system will establish whether completion requests would meet the intra-LATA criteria using the area code and exchange data (NPA-NXX) of the dedicated trunk and the NPA-NXX area code and exchange data of the destination identified in the directory listing. This first eligibility check can be eliminated and the DACC service expanded to include inter-LATA calls if CCS-7 signaling is fully available throughout the network, which will allow the identification and use of the customer's preferred inter-exchange carrier.

The present system provides additional screening to ensure that completion service is not offered to toll restricted/denied customers. Customers that would be unable to identify actual callers and collect for DACC surcharges, or, if applicable, intra-LATA toll charges, could also be screened. For example, a hotel/motel would be unable to immediately identify that a room quest had selected CR and would, therefore, be unable to collect charges before the quest checked out. Ineligible calls include the following:

| | |
|---|---|
| Hotels/Motels | Independents |
| Hospitals | Coinless Public Telephones |
| Dormitories | COCOTS |
| Marine | Interexchange Carriers |
| Inmates | Toll Restricted/Denied |

Screening of ineligible calls will be done on the basis of trunk group, screening code or individual line number and may require line class code and/or trunk translation changes in each end office. Implementation of call completion screening (and billing) also requires direct trunk groups (end office to Operator Services Switch) equipped with Operator Services signaling, i.e. the trunks must be able to forward the ANI of the originating telephone and Operator Services screen codes, e.g., hospitals are identified by the ANI screen code of "07" which identifies the call as billing restricted. In cases where the business does not purchase screen codes or as in the case of the Hotels/Motels not purchasing a Hotel/Motel class-of-service, there will be a screening table established that will screen the hotels/motels, hospitals, dormitories, etc.

The system can also offer to block call completion on demand. If a customer wishes to have their lines screened from the service, they may contact the TELCO operating the operator service system 20, and a blocking code will be placed on the customer's account. The system would recognize calls from a subscriber who requested such blocking based on the received ANI data; therefore, calls from such a subscriber's station will never receive the call completion prompting message.

Call completion to certain requested numbers, such as 900, 800 700, 556 and 976 can also be screened from the DACC offering.

Figure 3:
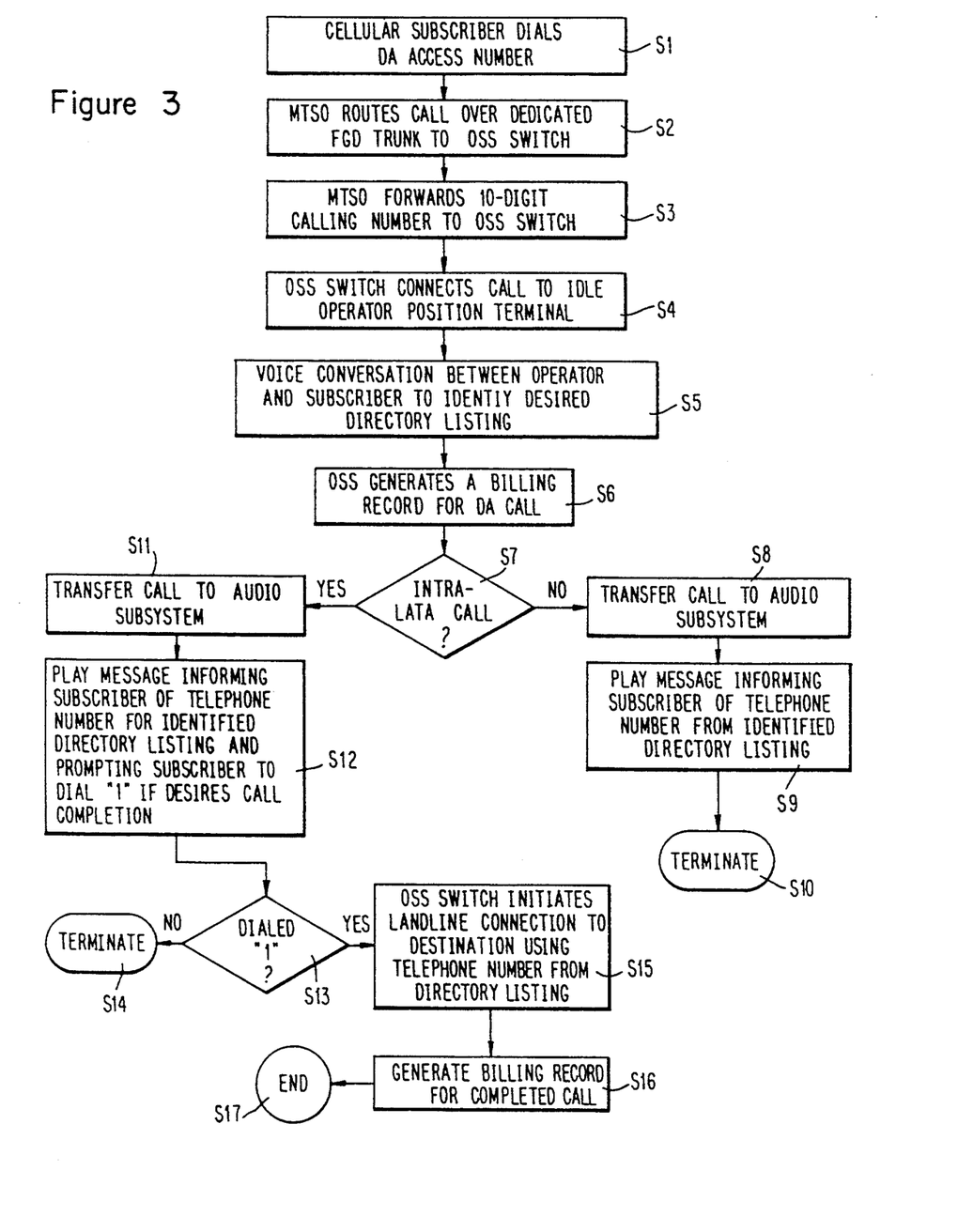
FIG. 3 is a flow chart showing the procedure for processing a directory assistance call from a cellular station, according to the present invention.

FIG. 3 shows a typical example of the call processing performed by the present invention. The cellular user will dial the directory assistance or DA access code 411, 555-1212 or area code plus 555-1212, as shown at step S1. The call will be transported through the cellular system to the Point of Interface to the operator service, which in the preferred system will be the MTSO 17.

The MTSO will switch the call over a dedicated trunk group 19 of a type using Feature Group D signaling, handling only directory assistance traffic, directly to the OSS switch 21, as shown in step S2. The MTSO 17 will also send FGD type signalling to switch 21, including the 10-digit number of the calling cellular subscriber (step S3).

The OSS switch 21 will switch the call to an idle directory assistance operator position terminal 23, and the Operator will handle the call using current voice conversation methods, e.g., to obtain information identifying a particular directory listing (step S5). The OSS switch 21 will generate a billing record for the directory assistance call (step S6).

Next, the OSS switch 21 will perform an inter/intra-LATA eligibility check (step S7). Although not shown, the switch will also perform any other desired eligibility checks, as discussed above. For example, the switch 21 may determine if a caller is calling from a toll restricted/denied location or the listing identifies a restricted destination (800, 700, 900, 556 or 976 type numbers).

For cellular originated calls the switch 21 uses the area code and exchange identification (NPA-NXX) of the dedicated Cellular Carrier directory assistance trunk group 19 and the area code and exchange identification (NPA-NXX) of the target listing, to perform the intra-LATA eligibility check (step S7). It would not be appropriate to use the ANI of the cellular phone in this screening procedure because the cellular station ANI data may not correspond in any way to its current location, especially for roamer users. If the landline connection is determined to be intra-LATA, the switch transfers the calls to the Audio Subsystem 27 (step S11) and the caller will receive one of the DACC prompts. The DACC prompt informs the caller of the telephone number of the station identified in the retrieved directory listing and offers the caller the call completion option, for example by telling the caller to press "1" (step S12).

The Announcement Subsystem 27 looks for a DTMF signal corresponding to the request code, e.g., "1" to determine if the caller has requested completion. Alternatively, if subsystem 27 can perform speech recognition, the user can say "yes" to trigger the call completion process (not shown). If the calling party chooses DACC service, for example by pressing "1" on the cellular phone as determined in step S13, the switch 21 will initiate the call completion through the public switched network to destination station 29 using the destination telephone number from the retrieved directory listing (step S15). The OSS switch will generate a billing record (step S16) for the completed call. Typically, the billing record will include the DACC surcharge, and the rating and duration for the landline portion of the call. The system identifies the Cellular Carrier by trunk group in this billing record, and then the call processing ends at step S17.

If at step S13 the OSS switch did not receive a DTMF signal indicating that the caller dialed a "1" within a set period, to request call completion, the call terminates at step S14. Although not shown in FIG. 3, the determination in step S13 may alternately rely on a time period without a hang up as a passive request by the caller for the call completion service, as discussed later. In this variation the OSS system may simply wait a set period, and if the call has not terminated due to the caller hanging up the handset of their telephone, the OSS switch 21 proceeds with call completion as shown at steps S15 and S16.

Returning to step S7 in FIG. 3, if the operator service system determined that the call was an inter-LATA call, not an intra-LATA call (or otherwise ineligible for call completion), the OSS switch 21 transfers the call to the audio subsystem 27 (step S8). In this case however, the audio subsystem is commanded to replay a message only announcing the directory listing telephone number (step S9). The message does not offer the call completion service. Subsequently, the call processing terminates at step S10, without completing the call to the identified destination station.

A wide variety of enhancements to DACC can be offered together with the call completion for cellular subscribers offered by the present invention. One enhancement is a call completion subscription service. A customer would subscribe in advance to have all of his directory assistance calls automatically completed without requiring the dialing of a "1" or the like to specifically request completion. The OSS switch would be programmed to recognize such a subscription customer based on the ANI of the calling station received via the dedicated Feature Group D trunk 19. Rather than instructing the caller to dial "1" the audio subsystem 27 would provide a prompt message instructing the caller to simply stay on the line. In step S13, the switch would monitor the incoming call, and if the caller does not hang up within a set time, the OSS switch 21 would complete the call to the destination station identified by the retrieved directory listing.

Another enhancement is an auto-collect Feature. A business customer would pay all charges for directory assistance type call completion to its premises, on a collect-call basis. The billing subroutine in the OSS switch would record the data for charges for call completion on the business customer's account. The announcement provided for such calls by the audio subsystem 27 would at least inform the directory assistance caller that the call can be completed to the business as a courtesy call, without charge to the caller. This announcement also could be personalized for the business customer. For example, a caller requesting a listing for the XYZ Pizza Delivery company might hear an announcement of the listing number, that XYZ is having a buy-one-get-one-free special this month, and that the call can be completed free of charge. Actual call completion could require dialing of the "1" as a completion request. Alternatively, the OSS switch could complete such calls if the caller stays on the line and does not hang up within a specified time, similar to the subscription enhancement discussed above.

The present system can be implemented with relatively minor modifications of existing cellular networks and directory assistance systems. The programming in the MTSO would remain essentially as it is in the existing systems. The only modification would be to change the translation tables in the MTSO to direct that switching office to route all directory assistance calls via the dedicated trunk using FG-D signaling.

The programming in the operator service system 20 also would only require minor modification by adding a software patch. Existing OSS switches are programmed to treat calls received on trunks using Feature Group D signaling as interexchange carrier calls and provide appropriate translations for routing and billing. Such translations are not compatible with directory assistance call completion processing. Also, the OSS switches currently perform eligibility checks and accounting functions using the ANI data of the calling station to indicate the geographic point of origin of the call. Such checks would not work properly and the billing would be inaccurate for roaming cellular subscribers. The software patch in the OSS switch modifies the program code of that switch to address these issues, as discussed in detail below.

The software patch bypasses the interexchange carrier translations for calls received over the dedicated trunk 19, even though that trunk is using Feature Group D signaling. Existing switch software enables eligibility checking routines to use the NPA-NXX of the dedicated trunk 19, and the corresponding MTSO, to indicate the point of origin of the landline connection. For example, in an inter-LATA/intra-LATA check, the program would actually compare the NPA-NXX of the trunk to the NPA-NXX of the destination station number from the directory listing to determine if the connection would be within the LATA or would cross over to a second LATA.

Existing system switches also perform a validity check of the ANI of the station calling for directory assistance to determine if the line the station connects to is within the area serviced by the system. If the received ANI data indicates a line outside the area, the system interprets the call as an ANI failure. The operator may be required to ask the caller for their correct number, and/or the system may treat the call as a fraudulent call. Roaming cellular telephone subscribers, however, will often have an assigned number for ANI purposes which is foreign to the area serviced by the directory assistance system. To provide the DACC service to such roaming cellular subscribers, the software patch will disable this validity check in the OSS switch 21, at least for calls coming in via any dedicated trunks connected to an MTSO of a cellular carrier.

The software patch would also modify the billing routines to use the NPA-NXX of the dedicated trunk 19 to calculate any distances needed to set call rates or toll charges for the landline connection. The detail reporting routine would accumulate all directory assistance call and call completion data (steps S6 and S16 in FIG. 3) in the carrier's account based on the identity of the dedicated trunk, but the reported data would include the ANI data identifying the terminal of the actual calling subscriber.

The OSS switch can be programmed to instruct the audio subsystem 27 to play specific announcements on a trunk group basis. For example, the message structure could provide a new field for identifying the carrier, to allow provision of a message customized for each cellular carrier.

From the above detailed description it becomes clear that the present invention allows a user of a wireless communication service, e.g. a cellular telephone subscriber, to dial directory assistance, and upon request, the directory assistance service system will complete a call connection to a station identified in a retrieved directory listing. The invention provides for recording of the request for call completion, any details of the connection to the identified station necessary for billing and the identity of the requesting terminal, in the directory assistance service system. All of this data is forwarded to the identified service operator who in turn adds charges for the call completion to the user's bill for wireless services.

We claim:

1. A method of providing a directory assistance call completion service to a wireless communication service subscriber comprising:
   receiving a request for directory assistance from a wireless communication terminal at a mobile communications switching office;
   forwarding data identifying the wireless communication terminal from the mobile communications switching office to an operator service system;
   establishing a landline communication link between the mobile communications switching office and the operator service system to provide two way communications between the wireless communication terminal and the operator service system;
   receiving information from the wireless communication terminal identifying a particular listing from a directory of listings;
   retrieving a destination number corresponding to the identified listing;
   receiving a request for completion of a communication link between the wireless communication terminal and a station identified by the destination number;
   establishing a landline communication link to provide a complete communication connection between the wireless communication terminal and the identified station; and
   recording the identity of the wireless communication terminal in the operator service system.

2. A method of providing a directory assistance call completion service as in claim 1, further comprising using the data identifying the wireless communication terminal to form a billing record indicating that the subscriber requested directory assistance call completion.

3. A method of providing a directory assistance call completion service as in claim 2, wherein the billing step comprises:
   forwarding the billing record to an operator of the mobile communication switching office; and
   including charges for the call completion in a bill for wireless communication services provided to the subscriber.

4. A method of providing a directory assistance call completion service as in claim 1, wherein the wireless communication terminal is a cellular telephone, and the mobile communication switching office is a mobile telephone switching office (MTSO), further comprising the step of establishing a wireless communication link between the cellular telephone and a cell cite antenna connected to the MTSO.

5. A method of providing a directory assistance call completion service as in claim 1, wherein the steps of forwarding data and establishing a landline communication link between the mobile communications switching office and the operator service system are both performed via a dedicated trunk connected between the mobile communications switching office and the operator service system.

6. A method of providing a directory assistance call completion service as in claim 5, wherein the dedicated trunk utilizes Feature Group D signaling.

7. A method of providing a directory assistance call completion service as in claim 1, further comprising:
   recording receipt of the request for completion from the identified wireless communication terminal in the operator service system; and
   calculating charges for said landline communication link.

8. A method of providing a directory assistance call completion service as in claim 1, wherein the identified station is a telephone station, and said landline communication link is established via a switched telephone network.

9. A method of providing a directory assistance call completion service as in claim 1,
   further comprising the step of using the data identifying the wireless communication terminal to determine if the subscriber has subscribed to a completion service,
   wherein if the subscriber has subscribed to a completion service the step of receiving a request for completion of a communication link comprises determining whether or not the subscriber has terminated communications at the wireless communication terminal within a set time period, the operator service system interpreting a failure of the subscriber to terminate within the set period as said request for completion of a communication link.

10. A method of providing a directory assistance call completion service as in claim 1, wherein the step of receiving a request for completion of a communication link comprises receiving a signal indicating that the subscriber dialed a predetermined digit on the wireless communication terminal.

11. A method of providing a directory assistance call completion service as in claim 1, further comprising the step of providing an announcement to the subscriber, the announcement including a prompt instructing the subscriber how to request call completion.

12. A method of providing a directory assistance call completion service as in claim 11, wherein the announcement is an audio message and further includes a spoken announcement of the retrieved destination number.

13. A method of providing a directory assistance call completion service as in claim 1, further comprising performing an eligibility check to determine if call completion is available, wherein the request for completion is received and the landline communication link is established only if the check indicates that call completion is available.

14. A method of providing a directory assistance call completion service as in claim 13, wherein:
the steps of forwarding data and establishing a landline communication link between the mobile communications switching office and the operator position switching system are both performed via a dedicated trunk connected between the mobile communications switching office and the operator position switching system, and
the step of performing an eligibility check comprises comparing data corresponding to the dedicated trunk to a portion of the retrieved destination number.

15. A system for providing a directory assistance call completion service to a subscriber to a wireless communication service offered via a mobile communications controller, said system comprising:
an operator service system (OSS), including at least one operator position terminal, an announcement system and a data base of directory listings; and
a dedicated trunk connected between the mobile communications switching office and the OSS, said dedicated trunk:
(i) carrying data identifying a wireless communication terminal, which has requested directory assistance, from the mobile communications switching office to the OSS, and
(ii) carrying information signals between the mobile communications switching office and the OSS sufficient to provide two way communications between the wireless communication terminal and the OSS;
wherein the OSS includes means responsive to the data carried by the dedicated trunk and a request for call completion from the wireless communication terminal received via the dedicated trunk for establishing a communication link between the mobile communications switching office and a station identified in a requested directory listing, to permit two-way communications between the wireless communication terminal and the identified station.

16. A system as in claim 15, wherein the OSS further includes means for performing an eligibility check using data identifying the dedicated trunk and data from the requested directory listing, and the means responsive to the data establish the communication link only if the data identifying the dedicated trunk or the data from the requested directory listing meets predefined criteria.

17. A system as in claim 15, wherein the OSS further includes means responsive to the data identifying the wireless communication terminal to record detailed accounting data regarding the request for completion.

18. A system as in claim 15, wherein the OSS provides switched telephone communications between the dedicated trunk and the at least one operator position terminal.

19. A system as in claim 18, wherein the OSS provides switched telephone communications between the dedicated trunk and the identified station.

20. A system as in claim 15, wherein the dedicated trunk utilizes Feature Group D type signaling.

21. A system for providing a directory assistance call completion service to a subscriber to a wireless communication service, comprising:
a wireless communication terminal;
a base station for sending and receiving wireless communication signals to and from the wireless communication terminal;
a mobile communications switching office for providing switched landline connections to the base station;
an operator service system (OSS), including at least one operator position terminal, an announcement system and a data base of directory listings; and
a dedicated trunk connected between the mobile communications switching office and the OSS,
said mobile communications switching office responding to a request for directory assistance from the wireless communication terminal and in response thereto:
(i) forwarding data identifying the wireless communication terminal to the OSS via the dedicated trunk, and
(ii) providing a connection between the base station and the OSS via the dedicated trunk, to provide two way communications between the wireless communication terminal and the OSS; wherein the OSS includes:
(a) means, responsive to the data forwarded via the dedicated trunk and a request for call completion from the wireless communication terminal received via the dedicated trunk, for establishing a communication link between the mobile communications switching office and the identified station, to permit two-way communications between the wireless communication terminal and the identified station; and
(b) means for recording the identification of the wireless communication terminal.

22. A system as in claim 21, wherein said base station and said mobile communications switching office are elements of a cellular telephone system servicing a plurality of cellular telephone terminals, and said wireless communication terminal is one of the cellular telephone terminals.

23. A system as in claim 21, wherein said means for establishing a landline communication link connects to a switched telephone network and establish the communication link via at least one landline of that network.

24. A system as in claim 21, wherein the dedicated trunk uses Feature Group D signaling.

25. A system as in claim 21, wherein the means for recording also records details of the connection to the identified station.

26. A system for providing a directory assistance call completion service to a terminal, comprising:
a communications switching system providing switched communication services to said terminal;

a directory assistance service system including a data base of directory listings; and a dedicated trunk using Feature Group D signaling connected between the communications switching system and the directory assistance service system, wherein in response to dialing of a directory assistance number on said terminal, said communications switching system (i) provides data identifying said terminal to said directory assistance service system via said dedicated trunk using Feature Group D signaling, and (ii) provides a communication link between said terminal and said directory assistance service system via said dedicated trunk using Feature Group D signaling; and wherein the directory assistance service system includes:

(a) means, responsive to the data forwarded via the dedicated trunk for establishing a communication link to an identified station, to permit two-way communications between the terminal and the identified station, and (b) means for recording the identity of the terminal.

27. A system for providing a directory assistance call completion service as in claim 26, wherein the means for recording also records the identity of the communications switching system based on identification of the dedicated trunk using Feature Group D signaling.

28. A system for providing a directory assistance call completion service as in claim 26, wherein the terminal is a wireless communication terminal and the communications switching system comprises a mobile communication switching office for providing two-way wireless communications to the terminal and switched connections to landline communication circuits.

29. A system for providing a directory assistance call completion service as in claim 28, wherein the wireless communication terminal is a cellular telephone station and the communications switching system comprises at least one cell cite antenna connected to the mobile communication switching office.

30. A system for providing a directory assistance call completion service as in claim 26, wherein the means for establishing a communication link to the identified station connects to a switched telephone network and provides said communication link to the identified station via at least one landline of the switched telephone network.

31. A system for providing a directory assistance call completion service to a wireless communication terminal, comprising:

a wireless communications system selectively providing communication services to said wireless communication terminal;

a directory assistance service system, including a data base of directory listings; and a dedicated trunk connected between a landline interface of the wireless communications system and the directory assistance service system, wherein in response to dialing of a directory assistance number on said wireless communication terminal, said wireless communications system (i) provides data identifying said wireless communication terminal to said directory assistance service via said dedicated trunk, and (ii) provides a communication link between said wireless communication terminal and said directory assistance service system via said dedicated trunk; and wherein the directory assistance service system includes:

(a) means, responsive to the data forwarded via the dedicated trunk and a request for call completion from said wireless communication terminal received via the dedicated trunk, for establishing a communication link to the identified station, to permit two-way communications between the wireless communication terminal and the identified station, and (b) means for recording the identity of the wireless communication terminal.

32. A system for providing a directory assistance call completion service as in claim 31, wherein the dedicated trunk utilizes Feature Group D signaling.

33. A system for providing a directory assistance call completion service as in claim 31, wherein the directory assistance service system comprises:

a plurality of operator position terminals; and an operator services system for providing switched connections between the dedicated trunk and selected ones of the operator position terminals.

34. A system for providing a directory assistance call completion service as in claim 31, wherein the directory assistance service system comprises:

means for providing audio announcements; and an operator services system (OSS) switch for selectively providing a switched connection between the dedicated trunk and the means for providing audio announcements to send a selected one of said audio announcements to the wireless communication terminal.

* * * * *